8076X
C. Page.
Corn Sheller.
Patented Mar. 13, 1834.
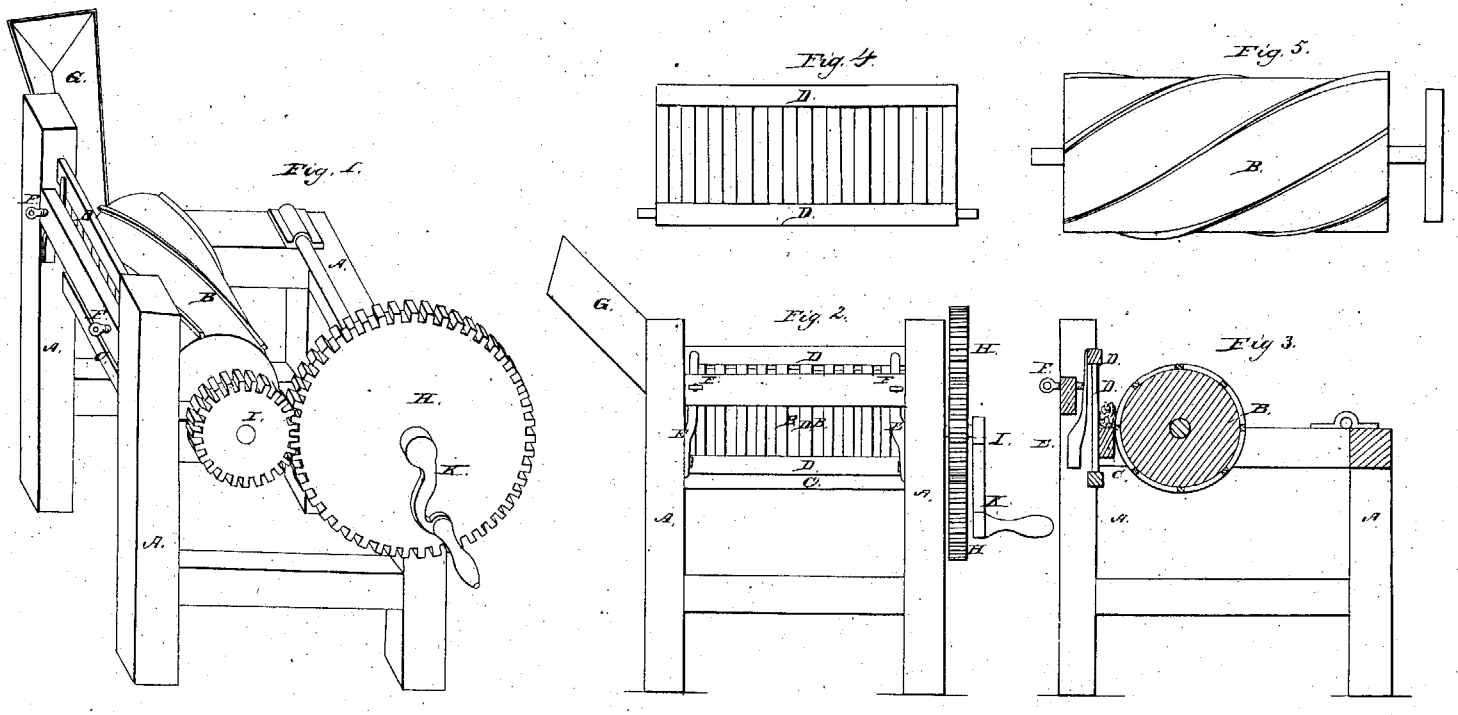
THE NORRIS PETERS CO., WASHINGTON, D. C.

8076X Mar. 13. 1834

Calvin Page of Sanbornton . New Hampshire

Letters Patent

The Schedule referred to in these Letters Patent and making part of the same containing a
description in the words of the said Calvin Page himself of his improvement in the machine
for shelling Corn To all to whom these presents shall come. Be it known that I Calvin Page of
Sanbornton in the County of Strafford and State of New Hampshire have invented a new
and useful machine for shelling Corn, to which machine I attach a winnowing appara
tus, by which it is cleaned at the same operation. and I do hereby declare that the follow
ing is a full and exact description thereof -- The frame of the machine may be varied
in its form, but that represented in the drawing thereof deposited in the Patent Office, I
have found to be a convenient one. The shelling is effected between a cylinder and a verti
cal rack or grating which is made moveable, so that it can be pressed closer to, or made to
recede from the cylinder as may be required. The diameter and length of the cylinder as well
as the size ~~and length~~ of the other parts of the machine are to be varied according to the
power to be applied to it. The cylinder may be made of wood, and in a small machine may
be a foot in diameter and two feet in length. Upon this cylinder iron beaters or shellers
are to be placed, which may consist of bars or rods of iron half an inch in width and a
quarter of an inch in thickness. These are to pass spirally from end to end of the cylin
der. Their inclination may be such as to carry each of them about one third of the way
round the cylinder. Of these there may be eight or any other convenient number, firmly attach
ed so as to stand out their whole thickness from the surface of the cylinder. To this, mo-
tion may be given by means of a cog wheel acting upon a pinion on one end of an iron
shaft upon which it revolves. The cylinder will answer well when standing horizontally
but it may be a little inclined towards the end from which the cobs are to escape. The spi
ral form of the beaters however may be made to force them out without this inclination.
In front of the cylinder and extending along it from end to end: is a bar of iron, or a strip
of wood faced with iron: upon which the ears of corn rest: and revolve as they are shelled
by the action of the beaters. This stands about level with the axis of the cylinder and
may be supported in its place in any convenient way. The corn is pressed against the
cylinder by the vertical Rack or grating before named. This consists of vertical slats at-
tached at each end to a cross piece by which they are framed together. The lower cross-

8076X piece works upon pivots or hinges being situated below the rest which sustains the corn usually as low down as the under side of the cylinder. The face of these slats should be covered with sheet iron to prevent their wearing. Against the back of this rack and near its upper edge two three or more springs are made to press and these may be regulated by screws bearing against them causing the rack to approach towards or recede from the cylinder The whole machine is covered by a close case surmounted by a hopper or feed hole, through which the corn to be shelled falls between the cylinder and the rack: from thence the grains pass directly down or between the slats on to a shoe or sloping bottom where there is a fan or winnowing mill operating in the ordinary way. The shaft of the fan wheel may be turned by a band from a wheel on the axis of the cylinder opposite to that on which the pinion is placed. The casing entirely prevents all scattering of the corn whilst in it there are suitable doors or shutters which may be opened to inspect the work and regulate the machine At that end of the rest towards which the curvature of the beaters carries the corn there is an opening left for the escape of the cobs which thus fall outside of the machine. The hopper or feed hole being at the opposite end to ensure its being completely shelled before it passes out — I do not claim as my invention any of the parts of this machine taken separately. nor do I claim the performing of the operations of shelling and cleaning simultaneously: this having been before effected. But what I do claim is the general construction and arrangement of the shelling part. consisting of the cylinder with its spiral beaters. the rest and the vertical rack constructed in the manner and operating upon the principles herein before set forth; without regard however to any particular dimensions or materials or to the precise form given to the respective parts Calvin Page Witnesses
Jas M Smith
Charles Tripp Drawing $36 recd